(12) United States Patent
Bergen et al.

(10) Patent No.: US 10,520,013 B2
(45) Date of Patent: Dec. 31, 2019

(54) ROLLER FOR DEFLECTING OR GUIDING A METAL STRIP TO BE COATED IN A METAL MELT BATH

(71) Applicants: THYSSENKRUPP STEEL EUROPE AG, Duisburg (DE); thyssenkrupp AG, Essen (DE)

(72) Inventors: Jegor Bergen, Rheinberg (DE); Martin Norden, Essen (DE); Florian Spelz, Oberhausen (DE)

(73) Assignees: THYSSENKRUPP STEEL EUROPE AG, Duisburg (DE); THYSSENKRUPP AG, Essen (DE)

( * ) Notice: Subject to any disclaimer, the term of this patent is extended or adjusted under 35 U.S.C. 154(b) by 108 days.

(21) Appl. No.: 15/736,512

(22) PCT Filed: Jun. 16, 2016

(86) PCT No.: PCT/EP2016/063821
§ 371 (c)(1),
(2) Date: Dec. 14, 2017

(87) PCT Pub. No.: WO2016/207049
PCT Pub. Date: Dec. 29, 2016

(65) Prior Publication Data
US 2018/0187716 A1    Jul. 5, 2018

(30) Foreign Application Priority Data

Jun. 22, 2015  (DE) .......................... 10 2015 211 489

(51) Int. Cl.
*F16C 13/00* (2006.01)
*C23C 2/00* (2006.01)
(Continued)

(52) U.S. Cl.
CPC ............. *F16C 13/006* (2013.01); *C23C 2/003* (2013.01); *C23C 2/38* (2013.01); *F16C 13/024* (2013.01); *B28B 11/006* (2013.01); *C23C 2/40* (2013.01)

(58) Field of Classification Search
CPC ........... B65G 39/00–20; C23C 2/00–40; F16C 13/00–06
See application file for complete search history.

(56) References Cited

U.S. PATENT DOCUMENTS

| 5,252,130 A | * | 10/1993 | Ookouchi | .......... | B22D 17/2023 |
| | | | | | 118/419 |
| 6,261,369 B1 | * | 7/2001 | Morando | ................... | C23C 2/00 |
| | | | | | 118/419 |

(Continued)

FOREIGN PATENT DOCUMENTS

| BE | 1011088 A3 * | 4/1999 | ............. C23C 2/003 |
| CN | 1890396 A | 1/2007 | |

(Continued)

OTHER PUBLICATIONS

Machine Translation for JP-2012-180552-A (Year: 2012).*

(Continued)

*Primary Examiner* — Jacob J Cigna
(74) *Attorney, Agent, or Firm* — The Webb Law Firm

(57) ABSTRACT

A roller may be used to deflect or guide a metal strip to be coated in a metal melt bath. The roller may comprise a steel roller shell and steel bearing journals that are connected to the roller shell and arranged coaxially to each other for a rotary supporting of the roller. Disposed on each bearing journal may be a substantially cylindrical or circular disk-shaped connection portion that is made of steel and that extends radially in a direction of the roller shell. At least one of the connection portions may have at least one through opening that emerges at an end face of the roller shell.

(Continued)

Further, a filling made of one or more filling elements that have at least one closed cavity may be arranged in the roller shell. The filling may have a structure that is symmetrical about an axis of rotation of the roller.

18 Claims, 3 Drawing Sheets

(51) Int. Cl.
  *C23C 2/38* (2006.01)
  *F16C 13/02* (2006.01)
  *B28B 11/00* (2006.01)
  *C23C 2/40* (2006.01)

(56) References Cited

U.S. PATENT DOCUMENTS

| | | | |
|---|---|---|---|
| 9,133,540 B2 * | 9/2015 | Jang | C23C 2/00 |
| 9,453,275 B2 * | 9/2016 | Bergen | C23C 2/003 |
| 9,670,573 B2 * | 6/2017 | Bergen | C23C 2/40 |
| 9,683,598 B2 * | 6/2017 | Gusek | C23C 2/003 |
| 9,745,653 B2 * | 8/2017 | Schaffrath | B05C 3/125 |
| 10,011,897 B2 * | 7/2018 | Gusek | C23C 2/00 |
| 10,081,857 B2 * | 9/2018 | Bergen | C23C 2/40 |
| 2003/0111779 A1 * | 6/2003 | Morando | C23C 2/00 266/233 |
| 2007/0074657 A1 * | 4/2007 | Hamayoshi | C04B 35/593 118/424 |
| 2012/0003391 A1 * | 1/2012 | De Kock | C23C 2/003 427/431 |
| 2013/0180076 A1 * | 7/2013 | Jang | C23C 2/00 15/339 |
| 2017/0343040 A1 * | 11/2017 | Jendrischik | F16C 13/02 |
| 2018/0002796 A1 * | 1/2018 | Niedringhaus | C04B 35/18 |
| 2018/0187716 A1 * | 7/2018 | Bergen | C23C 2/003 |

FOREIGN PATENT DOCUMENTS

| | | | | |
|---|---|---|---|---|
| DE | 3718286 A | | 12/1988 | |
| DE | 19542850 A | | 5/1997 | |
| DE | 19638079 A | | 4/1998 | |
| DE | 102008038400 A | | 4/2010 | |
| DE | 102009034017 A | | 1/2011 | |
| DE | 102011001216 A1 | * | 9/2012 | ............ B65G 39/00 |
| DE | 102011078878 A | | 1/2013 | |
| DE | 102011118197 A | | 5/2013 | |
| DE | 102013104267 A | | 2/2014 | |
| DE | 102013101134 A | | 5/2014 | |
| DE | 102013101131 A | | 8/2014 | |
| DE | 102013101132 A | | 8/2014 | |
| EP | 0292953 A | | 11/1988 | |
| JP | H08199321 A | | 8/1996 | |
| JP | 2001271151 A | | 10/2001 | |
| JP | 2005232566 A | | 9/2005 | |
| JP | 2006265624 A | | 10/2006 | |
| JP | 2007031804 A | | 2/2007 | |
| JP | 2011047031 A | | 3/2011 | |
| JP | 2012180552 A | * | 9/2012 | |
| JP | 2012241209 A | * | 12/2012 | |
| JP | 2013216926 A | | 10/2013 | |
| JP | 2013216926 A | * | 10/2013 | |
| WO | 9812440 A | | 3/1998 | |
| WO | 2012136713 A | | 10/2012 | |

OTHER PUBLICATIONS

English translation of ISR issued in PCT/EP2016/063821 dated Aug. 12, 2016 (dated Aug. 22, 2016).
English language Abstract for JP 2005232566 A listed above.
English language Abstract for JP 2006265624 A listed above.
English language Abstract for JP 2007031804 A listed above.
English language Abstract for JP H08199321 A listed above.

* cited by examiner

ROLLER FOR DEFLECTING OR GUIDING A METAL STRIP TO BE COATED IN A METAL MELT BATH

CROSS REFERENCE TO RELATED APPLICATIONS

This application is a U.S. National Stage Entry of International Patent Application Serial Number PCT/EP2016/063821, filed Jun. 16, 2016, which claims priority to German Patent Application No. DE 10 2015 211 489.9 filed Jun. 22, 2015, the entire contents of both of which are incorporated herein by reference.

FIELD

The present disclosure generally relates to rollers, including rollers for deflecting or guiding metal strips to be coated in metal melt baths.

BACKGROUND

In the hot-dip coating of metal strip, especially steel strip, the strip being coated is guided through the metal melt by means of a deflecting roller arranged in the melt bath. In addition, the section of strip emerging from the melt bath is usually guided by guiding rollers likewise arranged in the melt bath (so-called stabilization rollers or passline rollers), in order to ensure a substantially vertical and vibration-free running of the strip through a gap bounded by stripping nozzles. The stripping nozzles separate excess coating material from the strip or adjust the thickness of the layer of coating material adhering to the strip.

The deflecting rollers and guiding rollers used in hot-dip coating plants of the prior art are designed as solid-material rollers, open shell rollers or closed hollow rollers.

Closed hollow rollers still find application today, but they can only be operated with expensive ventilation equipment, since due to the high temperatures in the melt bath there may occur very high internal pressures in the closed roller cavity, even to the point of an explosive failure, especially if there are undesirable liquid inclusions in the roller cavity.

Due to the circumstance that the deflecting and guiding rollers in the melt bath are not normally provided with their own drive system, but instead are rotated by the movement of the strip wrapped around and lying against them, the use of solid-material rollers is a problem especially in the case of the hot-dip coating of thin strips. Due to the large weight of solid-material rollers, a rotation of the rollers by the strip is difficult, especially for thin strips, which may result in relative movement (slippage) between strip and roller. This may cause scratches and other coating flaws, which reduce the quality of the coating.

Shell rollers usually consist of a hollow cylindrical shell pipe, which is connected to the bearing journals at its two ends by spoke-like webs or recesses, such as end plates having boreholes. Melt bath rollers designed as shell rollers have the advantage of being easier to rotate as compared to the heavy solid-material rollers and have no enclosed cavities as compared to the enclosed hollow rollers in which a critical internal pressure can occur. But on account of the openings at the end faces, a pumping effect may occur during the rotation of the shell rollers, resulting in a turbulent flow of the metal melt in the region of the spoke-like webs or the recesses of the end plates, resulting in a very substantial material abrasion (wear) in the region of the webs or end plates. For this reason, the service life of shell rollers used in hot-dip coating plants is relatively short.

What is common to the mentioned designs of deflecting and guiding rollers is that their rotary bearings are usually designed as plain bearings, and the bearing journals of the rollers (as well as the abutments receiving the bearing journals) are subjected to very large abrasion influences. The great wear on the bearing journals is principally due to the high bearing forces and the corrosiveness of the metal melt.

Rollers of this kind are known for example from the patent applications US 2007/0074657 A1, DE 37 18286 A1 or WO 2012/136713 A1.

Thus a need exists for a roller with which a good coating quality can be achieved in hot-dip coating of metal strip, especially steel strip, and which at the same time affords relatively long service life.

DETAILED DESCRIPTION

Figure 1:
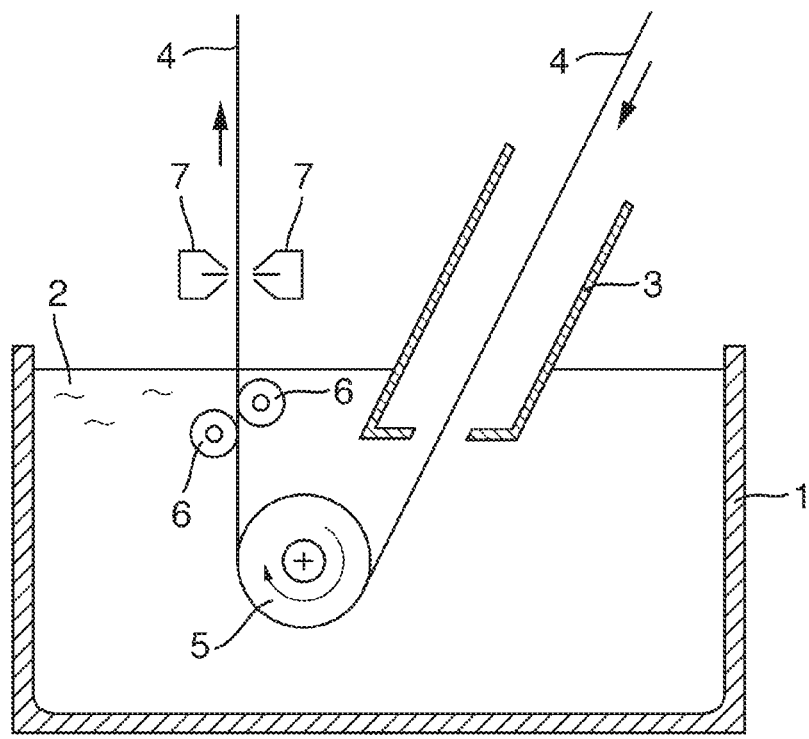
FIG. 1 is a schematic view of an example hot-dip coating device.
Figure 2:
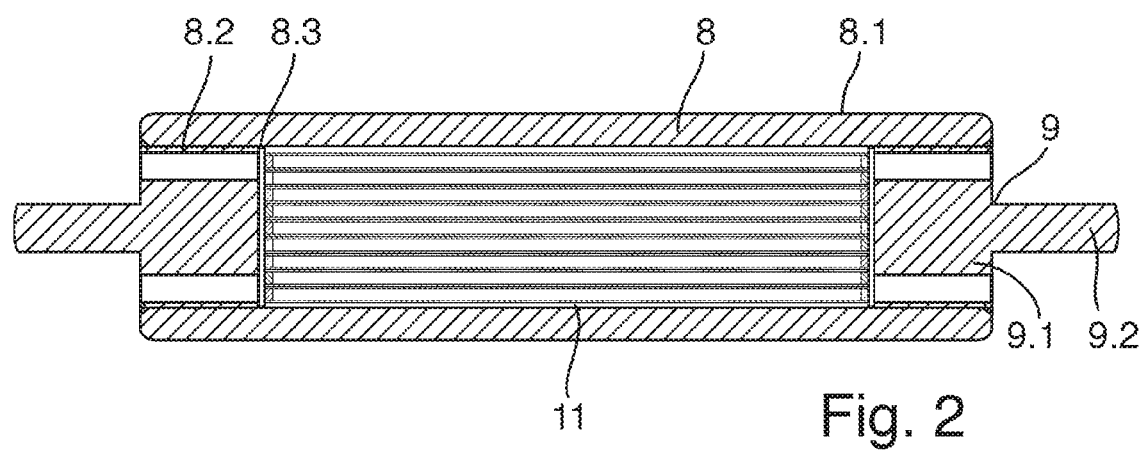
FIG. 2 is an axial cross-sectional view of an example roller for arrangement in a melt bath of a hot-dip coating plant.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally concerns rollers for deflecting or guiding a metal strip to be coated in a metal melt bath. In some examples, a roller may comprise a steel roller shell and steel bearing journals that are connected to the roller shell and arranged coaxially to each other for the rotary supporting of the roller. Disposed on the respective bearing journal may be a substantially cylindrical or circular disk-shaped connection portion that is made of steel and that extends radially in the direction of the roller shell. At least one of the connection portions may have at least one through opening that emerges at the end face of the roller shell.

The roller according to the invention comprises a steel roller shell, which is connected to steel bearing journals which are arranged coaxially to each other, wherein there is provided on the respective bearing journal a substantially cylindrical or circular disk-shaped connection portion which is made of steel and which extends radially in the direction of the roller shell, and wherein at least one of the connection portions has at least one through opening which emerges at the end face of the roller shell.

The roller according to the invention corresponds to a shell roller insofar as its roller shell defines a cavity. However, this cavity has a filling, having on the whole a lesser density than that of the roller shell material. This is accomplished in that the filling is made of at least one filling element in which at least one closed cavity is present. As compared to traditional solid-material rollers, the roller according to the invention is characterized by a relatively low roller weight. This holds especially for a design in which the cavity as defined by its roller shell is empty or gas-filled, but also in a design in which this cavity is filled with filling material having a lesser density than that of the shell roller material. Thanks to the relatively low weight of the roller according to the invention, it has good rotational properties in regard to its rotation by the strip being coated and lying against it, which is the necessary condition for a good coating quality of the strip. At the same time, the relatively low weight of the roller according to the invention relieves the load on its rotary bearing, which is advantageous in achieving long service life of the roller.

One advantageous embodiment of the invention calls for providing a plurality of cavities over the cross section of the filling element, wherein the filling element preferably has a cross section which is symmetrical about the axis of rotation of the roller. Thanks to this symmetrical structure, an imbalance of the roller due to one or more of the filling elements introduced can be largely prevented.

According to another advantageous embodiment of the invention, the at least one filling element is formed from longitudinal profiles in the form of hollow and/or solid profiles and which are joined together, such as by welding, in the preferred embodiment. The cavities are formed by the use of hollow profiles such as tubes or profiles with polygonal cross section, which are closed at both ends. Alternatively or additionally, cavities can be provided between the connected longitudinal profiles by closing the two ends.

In the cavities provided according to the invention, an increased internal pressure occurs, as also in the case of the hollow rollers mentioned in the prior art. But due to the significantly small effective diameter of the cavities, a significantly smaller stress occurs in the filling elements, so that an explosion-type failure of the cavities is prevented. This is also explained by the linear relation between stress and diameter in the boiler formula for the design of pressurized containers.

Another advantageous embodiment of the invention is characterized in that a filling material is arranged in one or more cavities of the filling element. The filling material or materials decrease or fill the empty volume of the cavities, so that the gas volume contained in the cavity of the roller is correspondingly reduced or minimized. In this way, the density and weight distribution in the filling element can be adapted. The filling material is preferably present in the form of powder, granules, or fleece or a molded piece. In particular, materials with temperature resistance lying above the melt temperature are preferred. For example, silicon powder or granules of ceramic material as well as steel or mineral wool and spirals or profiles can be considered as the filling material.

In another embodiment, the adaptation and adjustment of the density and weight distribution of the filling element or the roller is done by the use of different longitudinal profiles, which differ in regard to diameter and/or wall thickness. Thanks to an adapted weight distribution, it is likewise possible to adjust the rotational properties of the roller, such as moment of inertia.

According to one preferred embodiment, the overall density of the roller according to the invention lies in the range of 0.8 to 1.2 times, preferably 1.0 to 1.1 times, the density of the metal melt being used, such as a metal melt based on aluminum or zinc. The bearing forces caused by the weight of the roller are thus relatively small. In any case, the overall weight of the roller according to the invention is substantially less than the overall weight of solid-material rollers made of steel.

The hot-dip coating device represented schematically in FIG. 1 comprises a melt bath vessel 1, which is filled with a metal melt 2, such as one based on aluminum or zinc. Through a trunk 3 dipping into the metal melt 2, a steel strip 4 being coated is guided into the metal melt 2. In the melt bath vessel 1 there is arranged a deflecting roller (so-called dipping or pot roller) 5, by means of which the steel strip 4 is deflected from the downward slanting direction of travel into an upward, preferably substantially vertical direction of travel. Furthermore, there are arranged in the melt bath vessel 1 one or two guiding rollers (so-called stabilization rollers) 6, which serve to suppress vibrations of the steel strip 4 and thereby ensure the most accurate possible running of the strip 4 in relation to a stripping device 7. The stripping device removes excess coating material from the surface of the coated steel strip 4, for which it typically has stripping nozzles 7 operating with pressurized air or inert gas in the form of flat-jet nozzles.

The deflecting roller 5 and/or at least one guiding roller 6 have a structure which is represented for example in FIGS. 2 to 9. The roller 5 or 6 comprises a roller shell 8 made of steel, such as chromium-molybdenum steel. The roller shell 8 is tubular. The lateral surface 8.1 of the roller may be convex bulging, so that the outer diameter of the roller 5 or 6 diminishes from the middle toward the ends of the roller.

At the ends of the roller shell 8 there are arranged bearing journals 9 which are coaxially arranged with respect to each other, which are likewise made of steel, such as chromium-molybdenum steel. The respective bearing journal 9 has a substantially cylindrical or circular disk-shaped connection portion 9.1. The connection portion 9.1 is preferably formed as a single piece with the journal portion 9.2 protruding axially at the end face of the roller shell 8. The connection portion 9.1 extends from the journal portion 9.2 or the axis of rotation of the roller 5 or 6 radially in the direction of the roller shell 8. The roller shell 8 has at its ends increased-diameter internal surfaces 8.2, each of which defines an encircling internal shoulder 8.3. The connection portions 9.1 of the bearing journals 9 are shoved by form fit into the increased-diameter interior sections of the roller shell 8 and firmly connected to it, for example, by annular welded seams.

The outer diameter of the journal portion 9.2 of the bearing journal 9 is smaller by a factor in the range of 3.0 to 7.0, preferably 4.0 to 5.0, than the outer diameter of the roller shell 8. The use of a bearing journal 9 with a correspondingly small journal diameter (diameter of the journal portion 9.2) is preferred, since the journal portion 9.2 then presents less rolling resistance and thus the roller 5 or 6 can be turned more easily.

Figure 3:
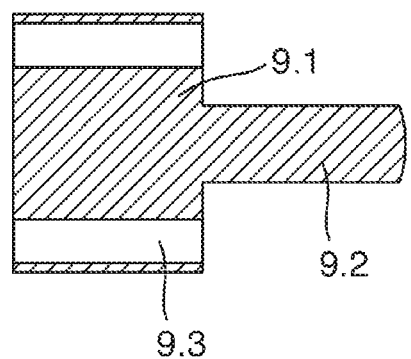
FIG. 3 is an axial cross-sectional view of an example bearing journal of a roller in an embodiment corresponding to FIG. 2.

The connection portion 9.1 of the respective bearing journal 9 has at least one or, as represented in FIG. 3, several through openings 9.3, which emerge at the end face of the roller shell 8 and also on the interior side of the connection portion 9.1 or bearing journal 9. In the sample embodiment shown, for example, four through openings 9.3 are provided in the respective connection portion 9.1 or bearing journal 9, which run substantially parallel to each other and are arranged equally spaced apart on a common partial circle. As a modification of this sample embodiment, the connection portion 9.1 or bearing journal 9 may also have fewer than or more than four through openings 9.3.

The respective through opening 9.3 is preferably fashioned as a borehole. In other embodiments, however, other shapes or also a spoke-like design of the connection portion 9.1 are also possible.

According to the invention, as is also shown for example in FIG. 2 and FIGS. 6 to 9, the cavity of the roller 5 or 6 bounded by the roller shell 8 and the connection portions 9.1 of the bearing journals 9 is filled with one or more filling elements 11, the filling element 11 containing at least one closed cavity.

Figure 4:
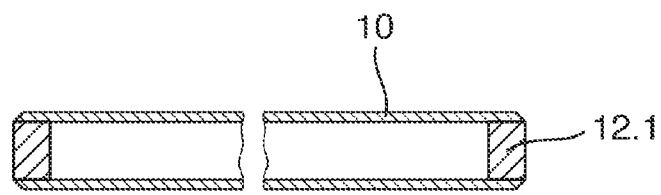
FIG. 4 is a cross-sectional view of an example longitudinal profile.

As shown in FIG. 4, a cavity in one embodiment according to the invention may be formed by a longitudinal profile 10 which is closed at both ends by a closure element 12.1. Such a closed hollow profile 10, 10.1, 10.3, 10.4 constitutes a filling element 11 according to the invention. In one preferred embodiment, however, several longitudinal profiles 10 are combined to form one filling element 11 and joined firmly to each other, especially preferably being welded together.

Figure 5:
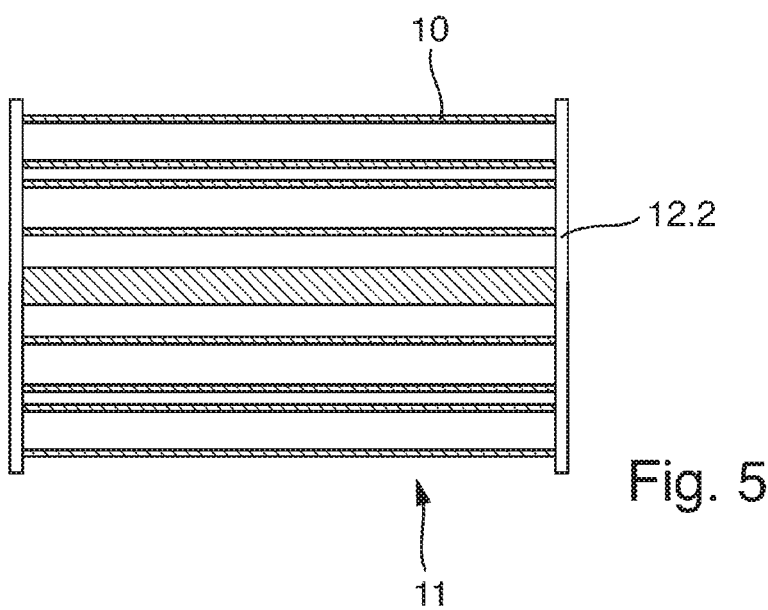
FIG. 5 is a cross-sectional view of an example filling element.

FIG. 5 shows another embodiment of a filling element 11, in which several longitudinal profiles 10 are joined together by a common closure element 12.2 and this closure element 12.2 at the same time closes the cavities lying in or between the profiles. The connection between the longitudinal profiles 10 and the closure element 12.2 is preferably done by means of welding.

FIGS. 6 to 9 show various embodiments for the filling element 11. All sample embodiments shown are shown with the roller shell 8 and in a cross section plane situated perpendicular to the axis of rotation. The cavity of the roller 5 or 6 between the connection portions 9.1 is preferably substantially entirely filled with the filling elements 11. Thanks to the enclosed cavities in the filling elements 11, the roller 5, 6 has reduced overall density as compared to the material of the roller shell 8. The diameter ratio between the outer diameter and the inner diameter of the roller shell 8 lies for example in the range of 1.2 to 2.0, preferably in the range of 1.4 to 1.6. The overall density of the roller 5 or 6 lies for example in the range of 0.8 to 1.2, preferably 1.0 to 1.1 times the density of the metal melt 2 used, which may be in particular a metal melt based on aluminum or zinc.

Figure 6:
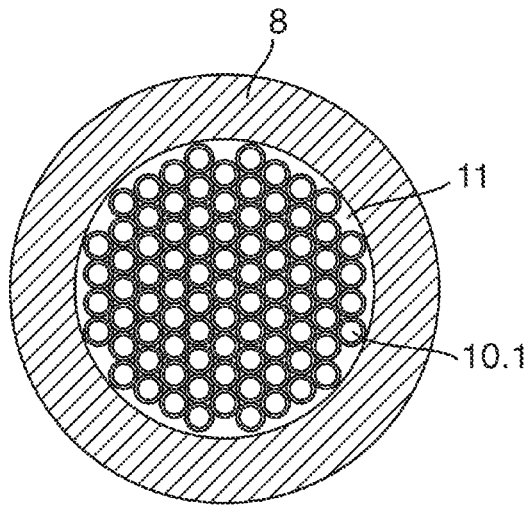
FIG. 6 is a cross-sectional view of another example roller.

In the embodiment shown in FIG. 6, the filling element or elements 11 are formed by tubes 10.1 as the longitudinal profiles 10. The embodiment with tubes 10.1 is especially preferred, since these are especially advantageous in regard to the stresses occurring due to the internal pressure in the cavities and at the same time a good filling can be achieved.

Figure 7:
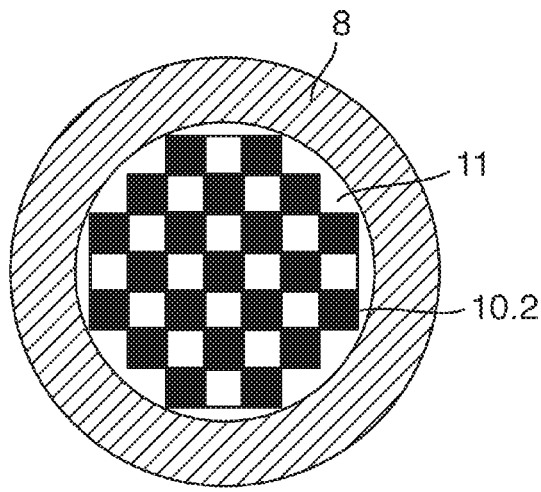
FIG. 7 is a cross-sectional view of still another example roller.

FIG. 7 represents an embodiment in which solid profiles 10.2, here square profiles, are used as the longitudinal profiles, these being joined together in the longitudinal direction. The cavities are formed by the interstices occurring between the profiles and closure elements 12.1, 12.2 arranged at both ends.

Figure 8:
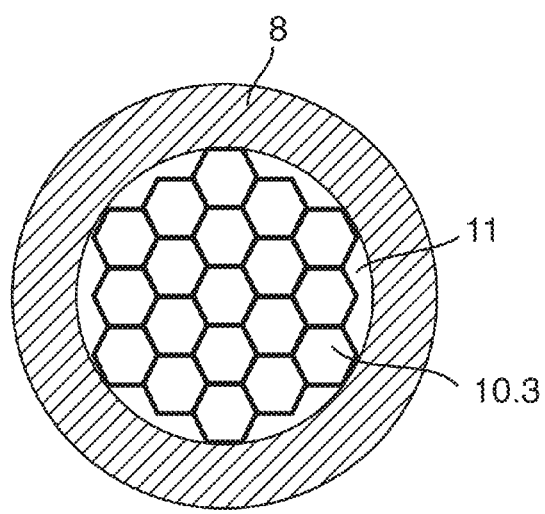
FIG. 8 is a cross-sectional view of yet another example roller.

Another embodiment is shown in FIG. 8. Here, regular longitudinal profiles 10 are likewise used, in this configuration with hexagonal hollow profiles 10.3. In general for a configuration according to the invention it is preferable to use longitudinal profiles 10 with a cross section having several planes of symmetry including the longitudinal axis, since these are favorable for a uniform density distribution, enable a good filling of the roller 5, 6, and are relatively economical.

Figure 9:
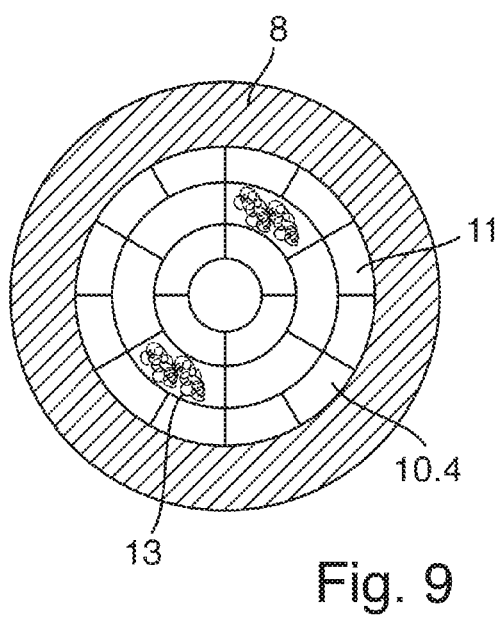
FIG. 9 is a cross-sectional view of another example roller.

FIG. 9 shows another embodiment in which a filling element 11 consists of several circular segment shaped sections 10.4.

Furthermore, FIG. 9 shows that at least some of the cavities are filled at least partly with a filling material 13. In the example shown, a fibrous filling material 13 such as steel or mineral wool is used, since these afford the advantage of being resistant to the operating temperature and have position stability inside the cavity. Alternatively, silicon powder can be used for example.

The embodiment of the invention is not confined to the sample embodiments represented in the drawing. Instead, further variants are conceivable, which also make use of the invention as indicated in the claims, albeit in modified configuration. Thus, for example, the longitudinal profiles 10 used in a filling element 11 may have different cross sections, diameters, and/or wall thicknesses in order to achieve the most uniform possible and/or favorable weight distribution inside the roller for the rotational properties.

In terms of the operating temperature and the internal pressure in the cavities caused by this, filling elements 11 preferably consist at least for the most part of steel. Especially in embodiments of filling elements having parts not under pressure load, or under less pressure load, these may also consist of other temperature-resistant materials preferably having less density, such as ceramic materials.

In order to prevent a relative movement especially about the axis of rotation between roller shell 8 and the filling element or elements 11, these comprise positioning means in a further embodiment, by which the filling elements 11 are connected to the roller shell (8) and/or connection portion 9.1 and also optionally to each other, preferably in detachable manner. Especially suitable for this are plug-in connections in the form of pins or protrusions.

LIST OF REFERENCE SYMBOLS

1 Melt bath vessel
2 Metal melt
3 Trunk
4 Steel strip being coated
5 Deflecting roller (so-called dipping roller or pot roller)
6 Guiding roller (so-called stabilization rollers)
7 Stripping device
8 Roller shell
8.1 Lateral surface
8.2 Internal surface
8.3 Internal shoulder
9 Bearing journals
9.1 Connection portion
9.2 Journal portion
9.3 Through opening
10 Longitudinal profile
10.1 Hollow profile (tube)
10.2 Solid profile (square)

10.3 Hollow profile (hexagon)
10.4 Cavity (circular ring segment)
11 Filling element
12 Closure element
12.1 Closure element (plug)
12.2 Closure element (plate)
13 Filling material

What is claimed is:

1. A roller for deflecting or guiding a metal strip to be coated in a metal melt bath, the roller comprising:
 a steel roller shell;
 steel bearing journals that are connected to the steel roller shell and are disposed coaxially to each other for a rotary supporting of the roller;
 a connection portion disposed on each of the steel bearing journals, each connection portion being substantially cylindrical or circular disk shaped and being comprised of steel, wherein each connection portion extends radially in a direction of the roller shell, wherein at least one of the connection portions includes a through opening that emerges at an end face of the steel roller shell; and
 a filling comprised of one or more filling elements that have a closed cavity, the filling being disposed in the steel roller shell, wherein the filling comprises a structure that is symmetrical about an axis of rotation of the roller.

2. The roller of claim 1 wherein an overall density of the roller is in a range of 0.8 to 1.2 times a density of a metal melt of the metal melt bath.

3. The roller of claim 1 wherein the filling is detachably connected to at least one of an interior of the steel roller shell or the connection portions.

4. The roller of claim 1 wherein the filling is detachably connected to an interior of the steel roller shell.

5. A hot-dip coating plant with at least one roller as recited in claim 1.

6. The roller of claim 1 wherein the closed cavity of at least one of the one or more filling elements is at least partially filled with a filling material.

7. The roller of claim 6 wherein the filling material is configured as powder, granules, or fleece.

8. A roller for deflecting or guiding a metal strip to be coated in a metal melt bath, the roller comprising:
 a steel roller shell;
 steel bearing journals that are connected to the steel roller shell and are disposed coaxially to each other for a rotary supporting of the roller;
 a connection portion disposed on each of the steel bearing journals, each connection portion being substantially cylindrical or circular disk shaped and being comprised of steel, wherein each connection portion extends radially in a direction of the roller shell, wherein at least one of the connection portions includes a through opening that emerges at an end face of the steel roller shell; and
 a filling comprised of one or more filling elements that have a closed cavity, the filling being disposed in the steel roller shell, wherein the filling comprises a structure that is symmetrical about an axis of rotation of the roller,
 wherein the one or more filling elements comprise one or more longitudinal profiles that contain at least one hollow profile that is closed at both ends.

9. The roller of claim 8 wherein the longitudinal profiles have different cross sections.

10. The roller of claim 8 wherein the longitudinal profiles have different wall thicknesses.

11. The roller of claim 8 wherein the longitudinal profiles have cross sections that are the same.

12. The roller of claim 8 wherein the longitudinal profiles have wall thicknesses that are the same.

13. A roller for deflecting or guiding a metal strip to be coated in a metal melt bath, the roller comprising:
 a steel roller shell;
 steel bearing journals that are connected to the steel roller shell and are disposed coaxially to each other for a rotary supporting of the roller;
 a connection portion disposed on each of the steel bearing journals, each connection portion being substantially cylindrical or circular disk shaped and being comprised of steel, wherein each connection portion extends radially in a direction of the roller shell, wherein at least one of the connection portions includes a through opening that emerges at an end face of the steel roller shell; and
 a filling comprised of one or more filling elements that have a closed cavity, the filling being disposed in the steel roller shell, wherein the filling comprises a structure that is symmetrical about an axis of rotation of the roller,
 wherein at least one of the one or more filling elements is configured as a tube bundle comprised of multiple interconnected tubes, and wherein at least some of the multiple interconnected tubes are closed at both ends.

14. The roller of claim 13 wherein the multiple interconnected tubes have different cross sections.

15. The roller of claim 13 wherein the multiple interconnected tubes have different wall thicknesses.

16. The roller of claim 13 wherein the multiple interconnected tubes have cross sections that are the same.

17. The roller of claim 13 wherein the multiple interconnected tubes have wall thicknesses that are the same.

18. A roller for deflecting or guiding a metal strip to be coated in a metal melt bath, the roller comprising:
 a steel roller shell;
 steel bearing journals that are connected to the steel roller shell and are disposed coaxially to each other for a rotary supporting of the roller;
 a connection portion disposed on each of the steel bearing journals, each connection portion being substantially cylindrical or circular disk shaped and being comprised of steel, wherein each connection portion extends radially in a direction of the roller shell, wherein at least one of the connection portions includes a through opening that emerges at an end face of the steel roller shell; and
 a filling comprised of one or more filling elements that have a closed cavity, the filling being disposed in the steel roller shell, wherein the filling comprises a structure that is symmetrical about an axis of rotation of the roller,
 wherein the filling is detachably connected to at least one of the connection portions.

* * * * *